Oct. 24, 1939.  P. SCHUPP ET AL  2,177,266
ELECTRICAL CONDENSER WITH DIELECTRIC OF POLYMERIC MATERIAL
Filed Feb. 20, 1937
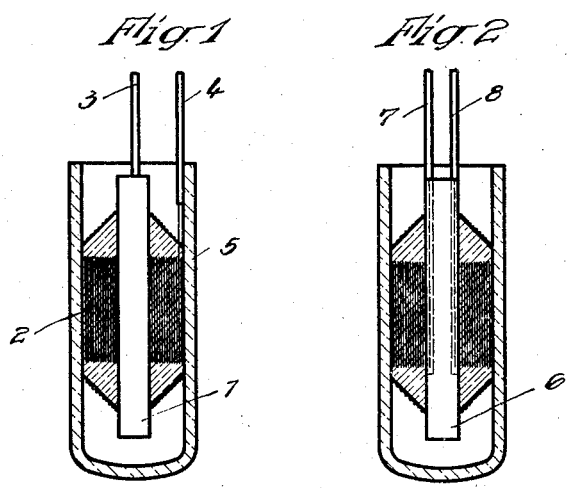

Patented Oct. 24, 1939

2,177,266

UNITED STATES PATENT OFFICE 2,177,266

ELECTRICAL CONDENSER WITH DIELECTRIC OF POLYMERIC MATERIAL

Paul Schupp, Berlin-Lichterfelde, and Fritz Wilke, Berlin-Siemensstadt, Germany, assignors to Siemens & Halske Aktiengesellschaft, Siemensstadt, near Berlin, Germany, a corporation of Germany Application February 20, 1937, Serial No. 126,868
In Germany February 20, 1936

10 Claims. (Cl. 175—41)

Our invention relates to an electric condenser with a dielectric of polymeric material. Electric, so-called "wound" condensers are made by winding two or more very thin metal strips with interposed and also very thin insulating strips to form a solid or hollow cylinder. In place of a metal strip may be used as condenser electrode material also insulating strips provided with metal covering in which the carrier of the electrode material may simultaneously be used as dielectric. The wound condensers, notwithstanding their small space requirements and very convenient shape, may possess high capacity values and for this reason are employed to advantage in many branches of electrical engineering. Wound condensers have the disadvantage, however, that when winding the condensers the pressing together of the coverings and the dielectric is limited by their permissible tensile strength. The winding having been completed, the pressing together of the various condenser layers can scarcely be effected any further. Hence, there may remain in the condenser small cavities filled with air, which cannot be entirely removed even when impregnating the condensers and which will have an interfering, capacity-changing effect when using the condensers in actual service.

Since the requirements for the different purposes for which a condenser may be used vary greatly, the materials of which the insulating bands are made are correspondingly selected in order to obtain definite desired capacity values of the finished product. Of particular interest as insulating material is polymeric material, because its insulating value is very great and its loss angle very small. Unfortunately, up to the present only block-shaped condensers could be made with such a material because the material is not very flexible and apt to crack and break when it is bent. Therefore, an economic manufacture of fair-sized capacity condensers, for instance in the form of wound condensers, has heretofore not been possible.

According to the present invention, however, it now becomes possible to make wound condensers also with polymeric material, if for this purpose films are used which have been made flexible by stretching the material. It is well known that polymeric materials, in particular polystyrol, can be brought into a stretched or expanded state by a mechanical process during its manufacture. For instance, on a film stretching machine, films are drawn to several times their original length during the process of manufacture. This material is flexible and does not show the disadvantages of brittleness of the original polystyrol. Thus, by using a polymeric material manufactured in this way, also wound condensers can be made with this material, which have excellent electric values and great constancy.

These expanded insulating films now have further the surprising property of contracting to their original length when heated. If this phenomenon is used in a condenser wound with this material as insulation, the material will contract, when heated to a suitable temperature, to such an extent that all air bubbles, which might have been accidentally enclosed during the coiling up process, are expelled from between the layers. Continuation of the thermal treatment finally results in welding together the edges of the insulating strips projecting beyond the metal coverings, thus preventing readmission of air into the condenser sheet roll when in use.

In a modification the condensers are preferably subjected to heat only to such an extent that in the final condition the insulating foils are still under a certain tension, namely, they are not totally "contracted". Applying heat in stages in this connection will be specially advantageous, permitting at the same time compensation of the capacity at a certain stretched condition, so that only very slight tolerances have to be dealt with in quantity production.

This method, allowing of a number of variations, generally subjects the condensers to preheating sufficient to cause the insulating foils to contract without, however, welding the edges. The temperature employed for this purpose is preferably about 80° to 100° C. Certain stretched conditions may be attained by grading the temperature and/or the period of heating. The condenser is measured in this condition and by removing some of the metallic coating or electrode material is adjusted to a value corresponding to the desired final value or to another experimentally determined quantity. This is followed by a second heating of the condenser which is intended to result in welding the edges without altering the adjusted capacity value noticeably or only to the desired extent.

This is attained by short-time, more intense thermal treatment which should preferably exceed 100° C. This will result in the welding of the projecting edges of the insulating foil without transmission of an appreciable amount of heat into the interior of the condenser. This is assisted by the low heat conductivity of these synthetic materials.

It is evident from the description of this method that it will be preferable to so fix the initial capacity value of the condensers that at the end of the first thermal treatment it is higher than the desired final value as compensation can only be effected by way of capacity reduction. The compensated intermediate value between the two heat stages must in this case show a capacity value which by the change due to the second thermal treatment will be reduced to its final value, whereby, of course, the manner of the second thermal treatment is of decisive importance for the magnitude of the intermediate value. The capacity value remains the same if such treatment is carried out too rapidly or at such temperature, that the edges are only welded at the outside without further contraction of the stretched strips in the interior of the condenser. If a slight change occurs owing to prolonged heat application the value of such change may be added to the intermediate value and all final values will be of the same magnitude provided that manufacture is carried out in a uniform manner.

In order to totally enclose the condensers in accordance with the invention it is advisable to pass at least one insulating foil around the condenser body as outer winding layer without an intermediate layer of electrode metal so as to permit welding of the material on all sides for obtaining a completely airtight enclosure of the condenser. The connections for the electrodes can be adapted to this purpose in various ways, for instance, in the form of wires arranged in zigzag manner or by lugs.

The nature of the invention will be further elucidated with the aid of the drawing, in which Figures 1 and 2 show two forms of a wound condenser in longitudinal section.

Referring to Figure 1, this figure shows two strips, consisting, for instance, of polystyrol in stretched condition, 50 mm. wide and 0.1 mm. thick and two aluminium foil strips, 30 mm. wide and 0.06 mm. thick, placed between the polystyrol strips and wound together in form of a roll 2 on a metal cylinder 1, which may be a pin or a tube, serving as core of the roll, and the roll is then heated for about four hours in a heating chamber at about 120° C. This results in a retransformation of the polystyrol, whereby the polystyrol strips contract tightly, pressing out the air in doing so, and finally welding firmly together at the edges projecting beyond the thin aluminium strips.

In selecting the dimensions of the insulating strips it must be borne in mind, that the strips under thermal treatment contract not only in a longitudinal direction but also in transverse direction and, as may also be seen from Figure 1, to an increased degree in the outer winding layers as compared to the inner winding layers, in which there is stronger friction of the layers of the strips. Hence, the insulating strips must be wider than the metal foil by a certain minimum amount. Strips may also be employed increasing in width winding towards the outer layers. Several insulating strips may be arranged between two metal coverings instead of one insulating strip for the purpose of increasing disruptive strength. An insulated wire 3 is soldered as leading-in wire to the metal cylinder conductively connected with the inner end of one of the foil electrodes. The other lead also consists of an insulated wire 4, the bare end of which is flattened and firmly pressed into the roll as connecting lug for the outer end of the other foil electrode. The condenser body is inserted as a whole into a tube 5 made of insulating material, which may be closed at one or both ends and may consist, for instance, of glass or polystyrol. A condenser made in this manner showed, with an external diameter of the roll of about 13 mm., a capacity of 4000 micro-microfarad and an insulating resistance of more than $10^7$ megohm, that is to say, more than 40,000 megohm for 1 microfarad.

The condenser may also be made in such a form, that both electrode connections consist of insulated wires flattened at the bare ends and each connected to one electrode, whereby one or more windings of insulating foil are wound first on the roll core as insulation against the core. The core itself may be employed as supporting element for mounting the condenser in an apparatus as one of the circuit elements, in particular if the core is provided with a concentric bore. It may also consist of insulating material, such as ceramic substances or glass.

Figure 2 shows a further mode of construction of a wound condenser in accordance with the invention, which differs from the modification Figure 1 insofar as the roll core here does not consist of a metal cylinder but for instance of a pin of stretched polymeric material having a thickness of, for instance, 5 mm. This pin 6 is provided with two longitudinal grooves diametrically opposed to one another into which are inserted the connecting wires 7 and 8, on the bare ends of which are wound several turns of the ends of the metal coverings of the condenser. The employment of grooves is of advantage also with roll cores made of other insulating materials, but the use of a roll core consisting of stretched polymeric material results in a special advantage, since the heating of the condenser body shortens the core pin and increases its diameter in consequence thereof. This results in exerting considerable pressure on the roll from the inside, which on the one hand presses firmly together the leads with the coverings in the grooves and on the other hand assists in the removal of the hollow and air-filled spaces.

In the case of the condenser according to Figure 2 the heating is not continued up to complete relaxation of the foils, so that the condenser body is continually under mechanical tension. In consequence thereof short-time thermal overloads can be sustained without material damages, such overloads having the effect, that the foils contract still further owing to their being still in a stretched condition. Thus the originally loosely inserted connecting lugs will in particular remain firmly enclosed ensuring good contact.

Removal of the inclosed air will be greatly assisted by having the thermal treatment take place under vacuum. Vacuum should be applied either only during the retransformation of the polymeric materials or only during the welding of the projecting edges or during both processes. If deemed necessary the temperature of the treatment may be increased for the purpose of accelerating the welding of the edges. In order to ensure reliable welding of the edges it is recommended to keep the insulating strips to be wound in a very clean condition and subject them, if needs be, to a preliminary cleaning.

For the manufacture of these condensers according to the invention may be employed as dielectric all polymeric substances permitting of being welded by thermal treatment. Suitable for this purpose are in particular vinyl compounds, such as polystyrol, poly-vinyl chloride or poly-acrylic acid ester or mixed poly-merisates thereof.

We claim as our invention:

1. An electrical condenser having foil-like electrodes and a dielectric of polymeric material arranged in layers in contracted state, and alternating with the electrode layers and projecting beyond the electrode layers on all sides and welded together at said projecting portions to enclose said electrodes.

2. An electric condenser having foil-like electrodes and a dielectric of polymeric material rolled up in layers in contracted state and alternating with the electrode layers and projecting beyond the electrode layers on all sides and welded together at said projecting portions to enclose said electrodes, and a core of polymeric material in contracted state on which said layers are wound, said core having longitudinal grooves on diametrically opposite sides and wires in said grooves connected respectively with said electrodes and protruding beyond said dielectric material to form the terminals of the condenser.

3. Method of producing an electrical condenser wound in alternating layers of polymeric dielectric and foil electrode material, consisting in winding the alternating layers upon themselves with the dielectric material in expanded condition, and subjecting the wound roll to a thermal treatment sufficient to retransform the dielectric material from its original expanded condition to a desired lesser degree of expansion whereby through the contraction of said material incident air enclosures are eliminated.

4. Method of producing an electrical condenser wound in alternating layers of polymeric dielectric and foil electrode material, consisting in winding the alternating layers upon themselves with the dielectric material in expanded condition and protruding on all sides beyond the foil electrode material, subjecting the wound roll to a thermal treatment only sufficient to retransform the dielectric material from its original expanded condition to a desired lesser degree of expansion, whereby through the contraction of said material incident air enclosures are eliminated, and then subjecting the protruding material edges to a welding temperature only sufficiently long to weld them together to enclose the electrode material.

5. Method of producing an electrical condenser wound in alternating layers of polymeric dielectric and foil electrode material, consisting in winding the alternating layers upon themselves with the dielectric material in expanded condition and protruding on all sides beyond the foil electrode material, subjecting the wound roll to a thermal treatment in several stages below the welding point of the dielectric material only sufficient to retransform the dielectric material from its original expanded condition to a desired lesser degree of expansion, whereby through the contraction of said material incident air enclosures are eliminated, and then subjecting the protruding material edges to a welding temperature only sufficiently long to weld them together to enclose the electrode material.

6. Method of producing an electrical condenser wound in alternating layers of polymeric dielectric and foil electrode material, consisting in winding the alternating layers upon themselves with the dielectric material in expanded condition and protruding on all sides beyond the foil electrode material, subjecting the wound roll to a thermal treatment in several stages below the welding point of the dielectric material only sufficient to retransform the dielectric material from its initial expanded condition to a desired lesser degree of expansion at which the capacity of the condenser has attained the desired value, whereby through contraction of said material incident air enclosures are eliminated, and then subjecting the protruding material edges to a welding temperature only sufficiently long to weld them together to enclose the electrode material.

7. Method of producing an electrical condenser wound in alternating layers of polymeric dielectric and foil electrode material consisting in winding the alternating layers upon themselves with the dielectric material in expanded condition and protruding on all sides beyond the foil electrode material, subjecting the wound roll to a thermal treatment in several stages at temperatures between 80° and 100° C. only sufficient to retransform the dielectric material from its initial expanded condition to a desired lesser degree of expansion at which the capacity of the condenser has attained the desired value, whereby through contraction of said material incident air enclosures are eliminated, and then subjecting the protruding material edges to a welding temperature only sufficiently long to weld them together to enclose the electrode material.

8. Method of producing an electrical condenser wound in alternating layers of polymeric dielectric and foil electrode material, consisting in winding the alternating layers upon themselves with the dielectric material in expanded condition and protruding on all sides beyond the foil electrode material, subjecting the wound roll to a thermal treatment in several stages at temperatures between 80° and 100° C. only sufficient to retransform the dielectric material from its initial expanded condition to a desired lesser degree of expansion at which the capacity of the condenser has attained the desired value, whereby through contraction of said material incident air enclosures are eliminated, and then subjecting the protruding material edges to a welding temperature only sufficiently long above 100° C. to weld them together to enclose the electrode material.

9. An electrical condenser having foil-like electrodes and a dielectric of polymeric material arranged in layers in contracted state and alternating with the electrode layers.

10. An electrical condenser having foil-like electrodes and a dielectric of polymeric material arranged in layers in contracted state and alternating with the electrode layers, and a core of polymeric material in contracted state on which said layers are wound, said core having longitudinal grooves on diametrically opposite sides and wires in said grooves connecting respectively with said electrodes and protruding beyond said dielectric material to form the terminals of the condenser.

PAUL SCHUPP.
FRITZ WILKE.